US011158432B1

(12) United States Patent
Reid et al.

(10) Patent No.: US 11,158,432 B1
(45) Date of Patent: Oct. 26, 2021

(54) HEAT PIPE REACTOR CORE AND HEAT EXCHANGERS FORMATION AND DEPLOYMENT

(71) Applicant: Triad National Security, LLC, Los Alamos, NM (US)

(72) Inventors: Robert Stowers Reid, Santa Fe, NM (US); Patrick Ray McClure, Los Alamos, NM (US); David Irvin Poston, Los Alamos, NM (US); Venkateswara Rao Dasari, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 466 days.

(21) Appl. No.: 15/828,933

(22) Filed: Dec. 1, 2017

Related U.S. Application Data

(60) Provisional application No. 62/432,396, filed on Dec. 9, 2016.

(51) Int. Cl.
*G21C 15/257* (2006.01)
*G21C 15/04* (2006.01)
*G21C 15/06* (2006.01)

(52) U.S. Cl.
CPC ........... *G21C 15/257* (2013.01); *G21C 15/04* (2013.01); *G21C 15/06* (2013.01); *G21Y 2004/30* (2013.01)

(58) Field of Classification Search
CPC ....... G21C 15/04; G21C 15/06; G21C 15/257
USPC .............. 376/347, 350, 351, 367, 904, 918
See application file for complete search history.

(56) References Cited

U.S. PATENT DOCUMENTS

| 3,322,644 A * | 5/1967 | Benson ................... G21C 1/00 376/385 |
| 4,133,374 A * | 1/1979 | York .................... F28F 9/0241 165/82 |
| 6,192,974 B1 * | 2/2001 | Boedecker ............... F28F 9/02 165/157 |

OTHER PUBLICATIONS

McClure, "Design of megawatt power level heat pipe reactors", No. LA-UR-15-28840, Los Alamos National Lab (LANL), 2015. (Year: 2015).*

(Continued)

*Primary Examiner* — Jack W Keith
*Assistant Examiner* — Daniel Wasil
(74) *Attorney, Agent, or Firm* — LeonardPatel PC; Sheetal S. Patel; Michael A. Leonard, II

(57) ABSTRACT

A heat pipe reactor may include a reactor core and one or more heat exchangers positioned on one or both sides of the reactor core. The heat pipe reactor may also include a plurality of heat pipes extending from the reactor core and out through the one or more heat exchangers. The reactor core may be composed of a plurality of monolithic blocks.

15 Claims, 12 Drawing Sheets

(56) References Cited

OTHER PUBLICATIONS

Wright, "Proposed design and operation of a heat pipe reactor using the Sandia National Laboratories annular core test facility and existing UZrH fuel pins", In AIP Conference Proceedings, vol. 746, No. 1, pp. 449-460, American Institute of Physics, 2005. (Year: 2005).*

Ring, "Fabricating the Solid Core Heatpipe Reactor", In AIP Conference Proceedings, vol. 813, No. 1, pp. 776-782, American Institute of Physics, 2006. (Year: 2006).*

Wikipedia, "Structural support", Dec. 2020, https://en.wikipedia.org/wiki/Structural_support#Simple_support. (Year: 2020).*

Luebkeman, "Support and Connection Types", MIT lecture, 1998, http://web.mit.edu/4.441/1_lectures/1_lecture13/1_lecture13.html. (Year: 1998).*

* cited by examiner

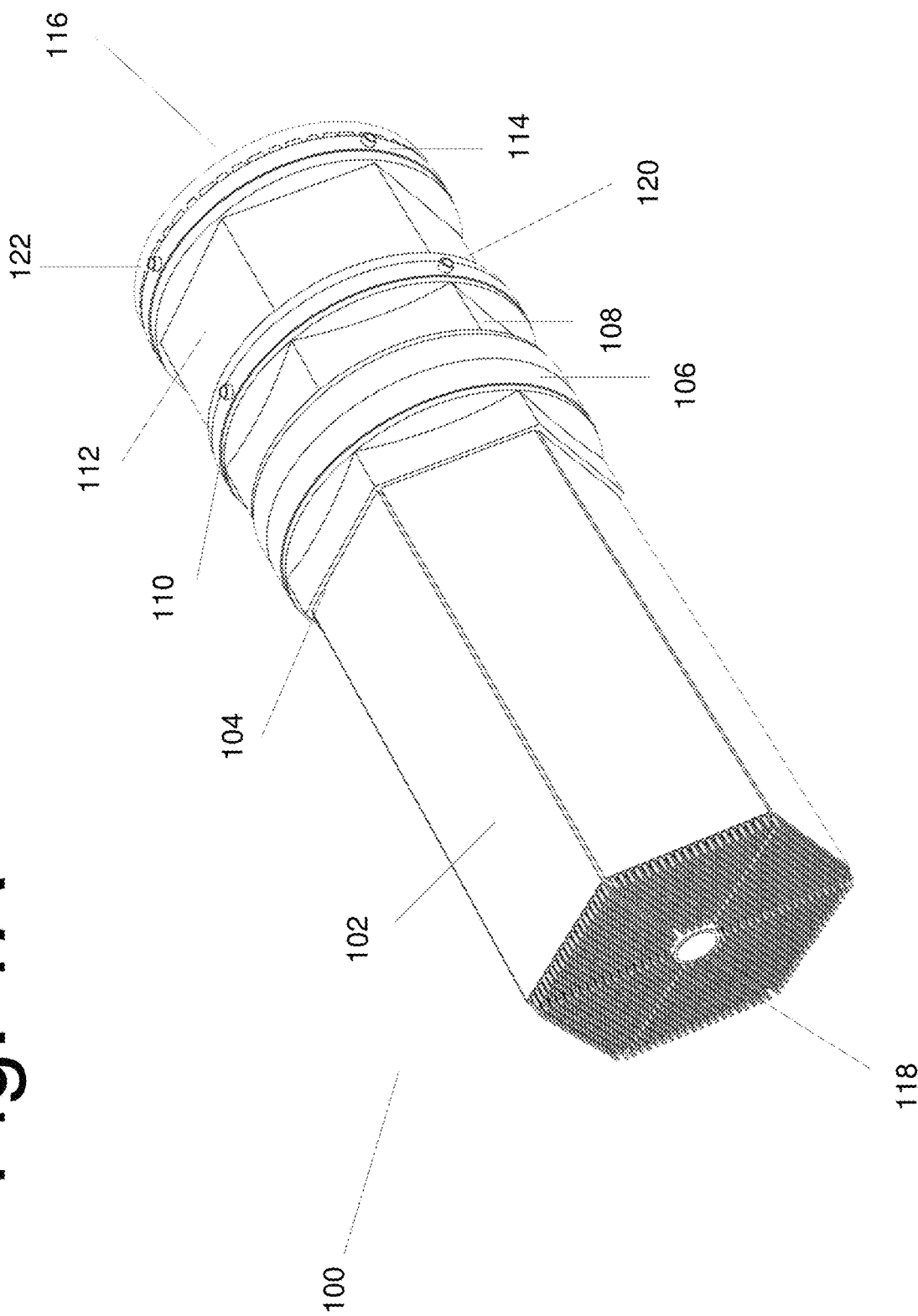

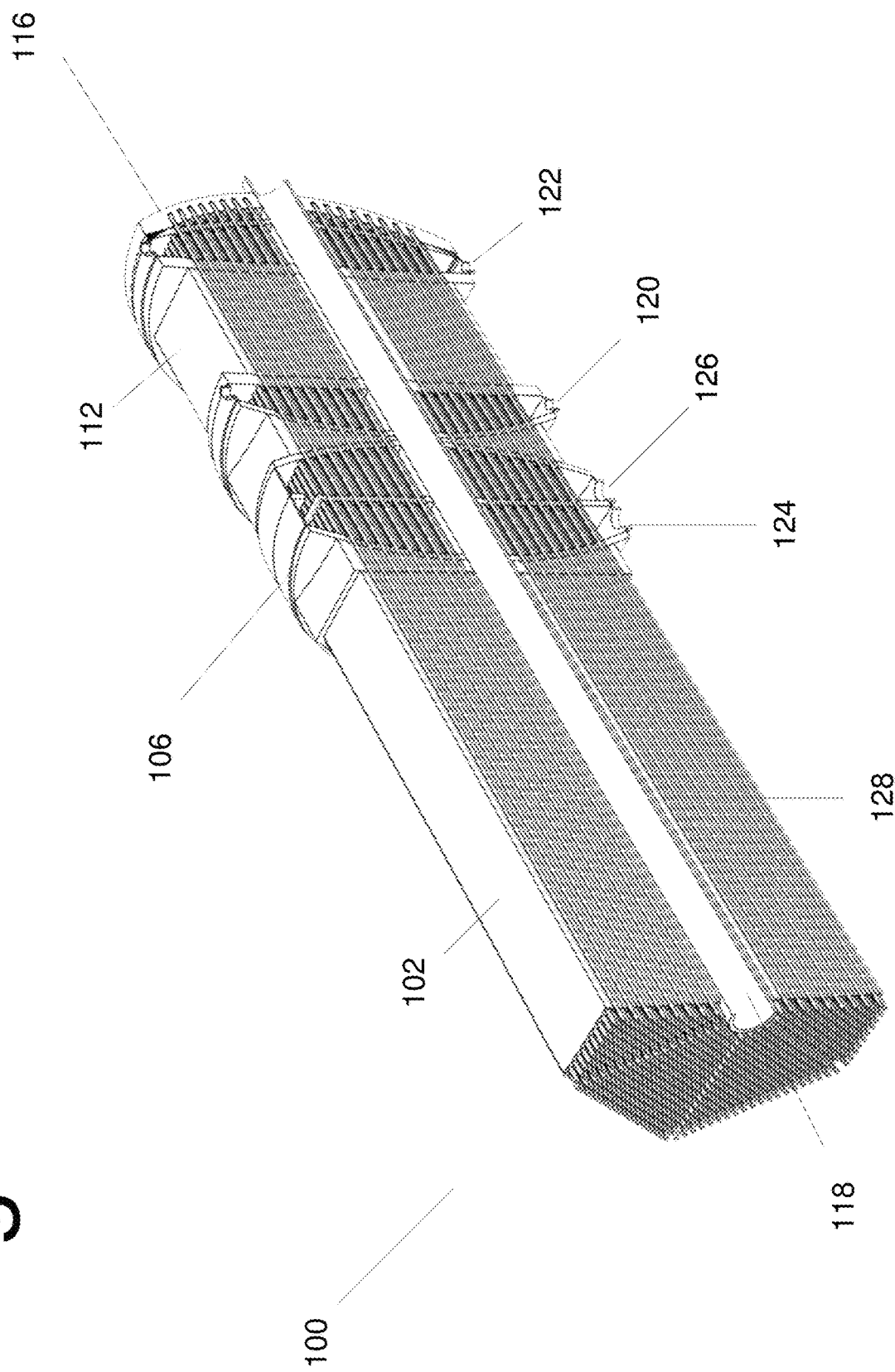

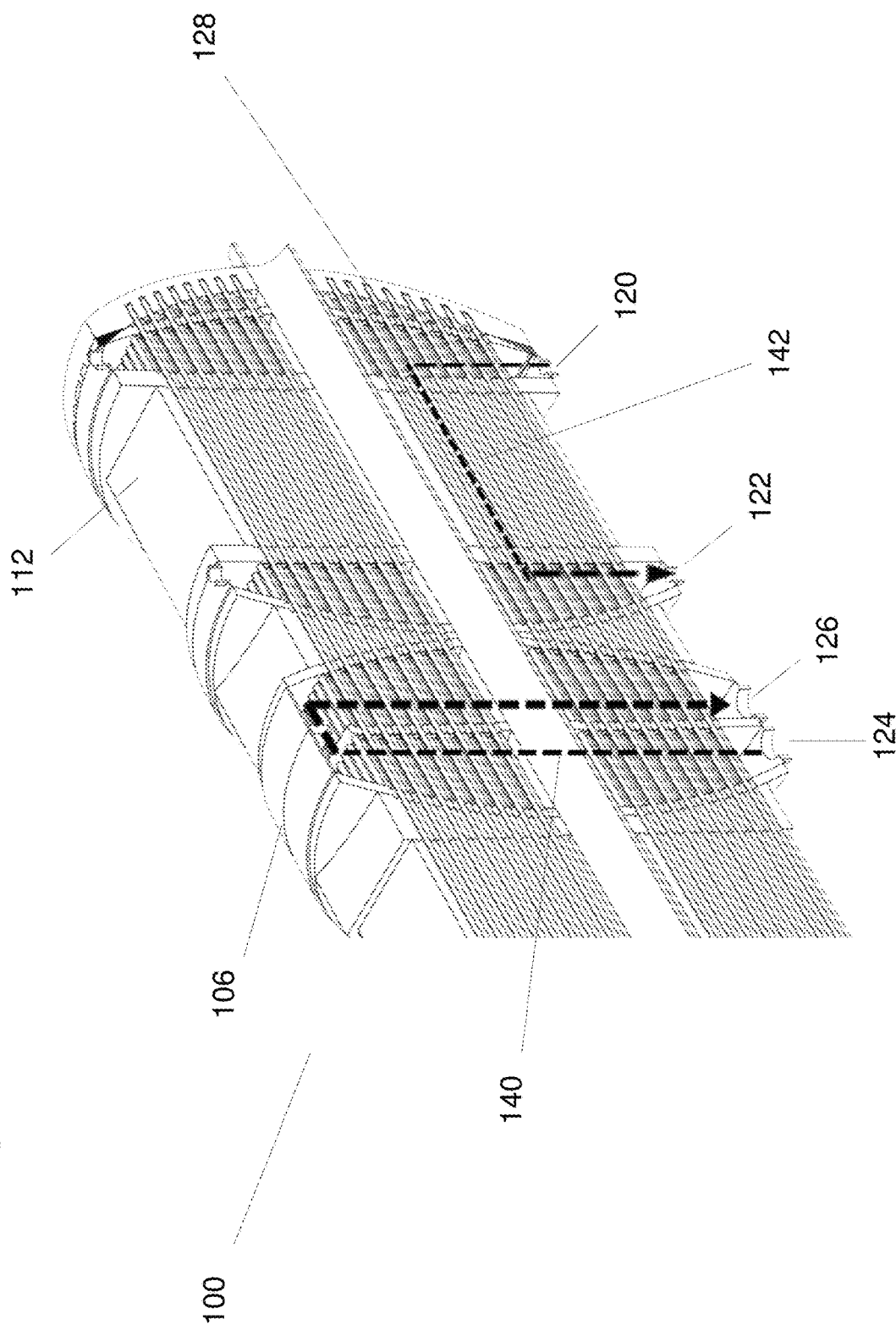

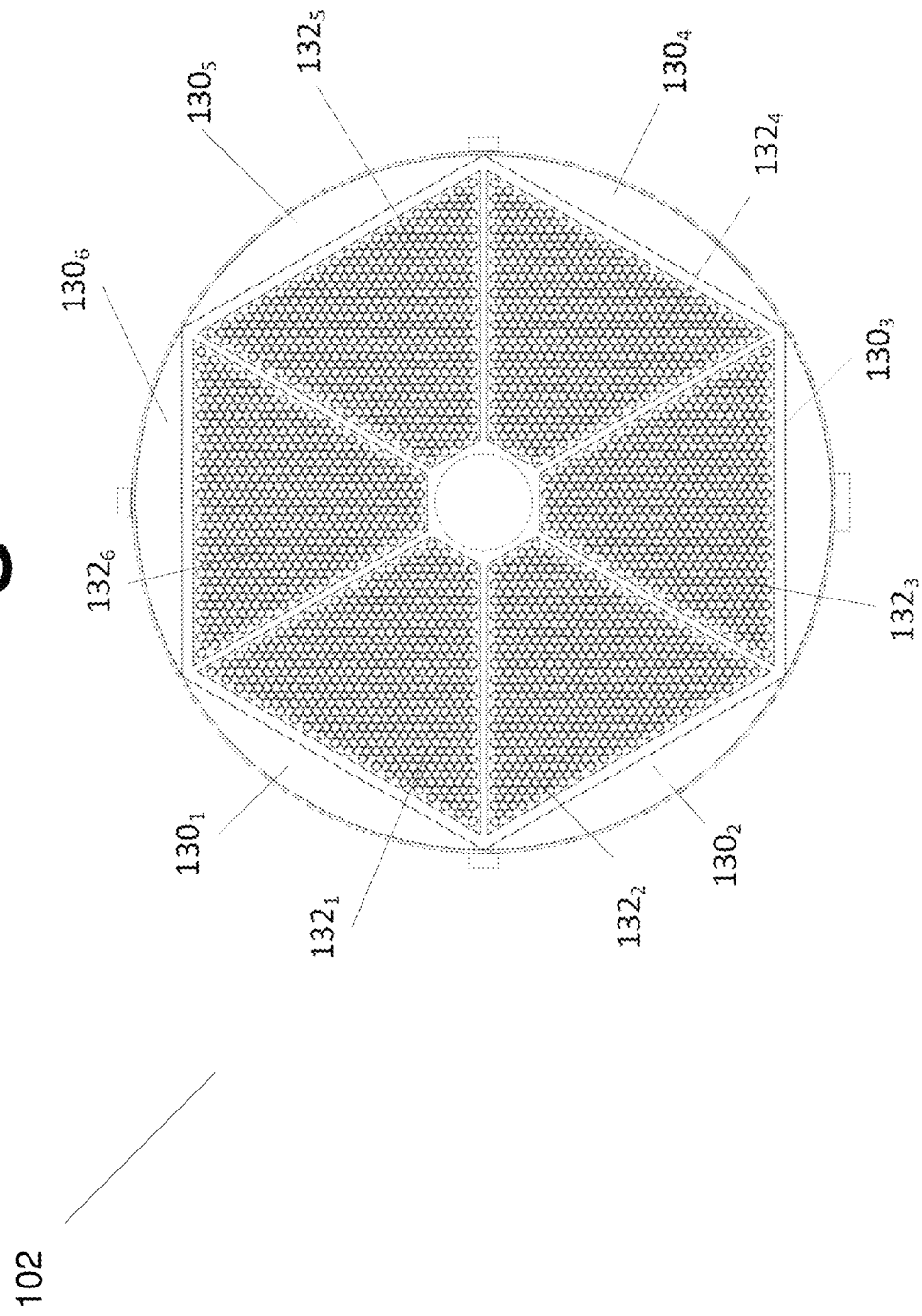

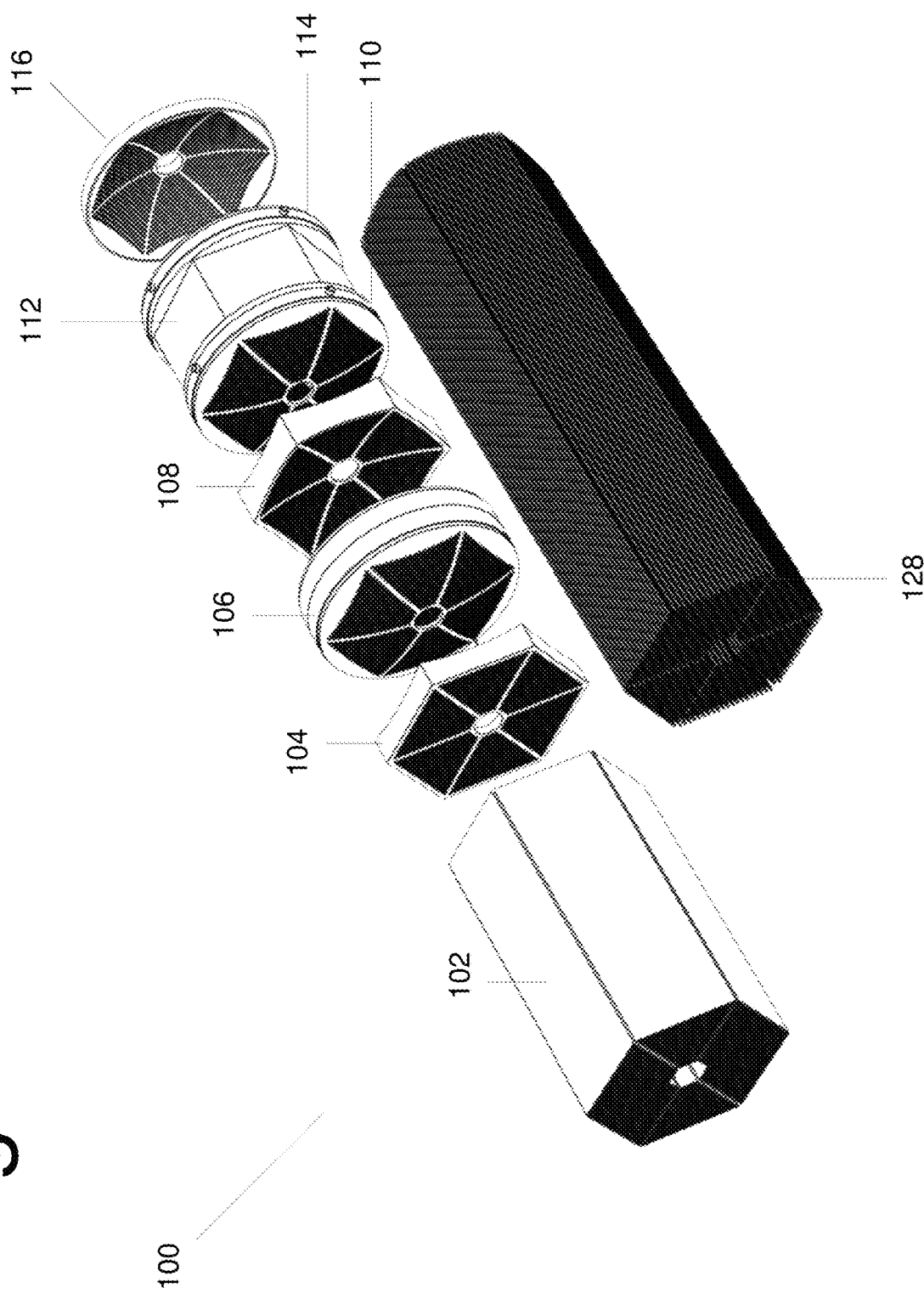

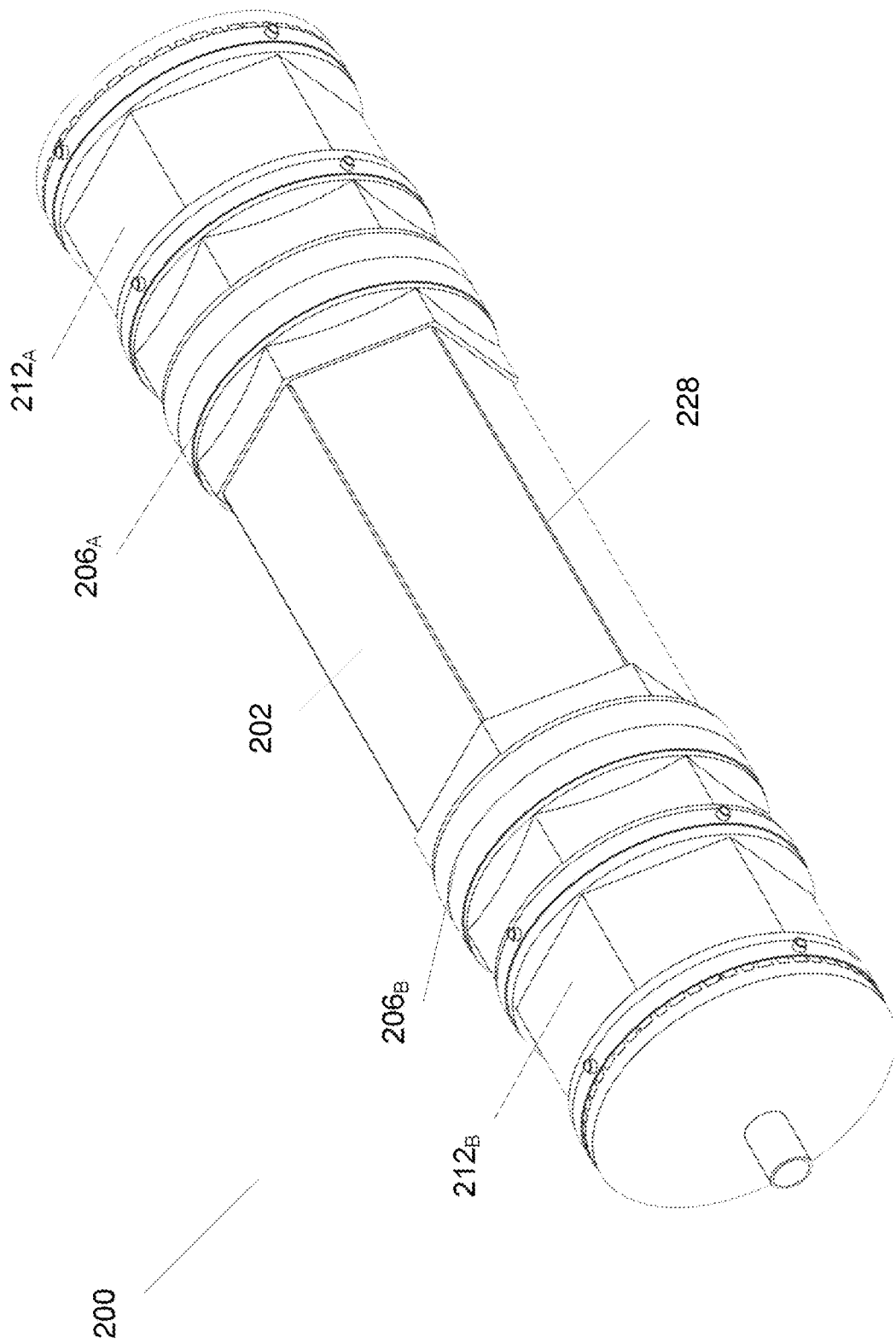

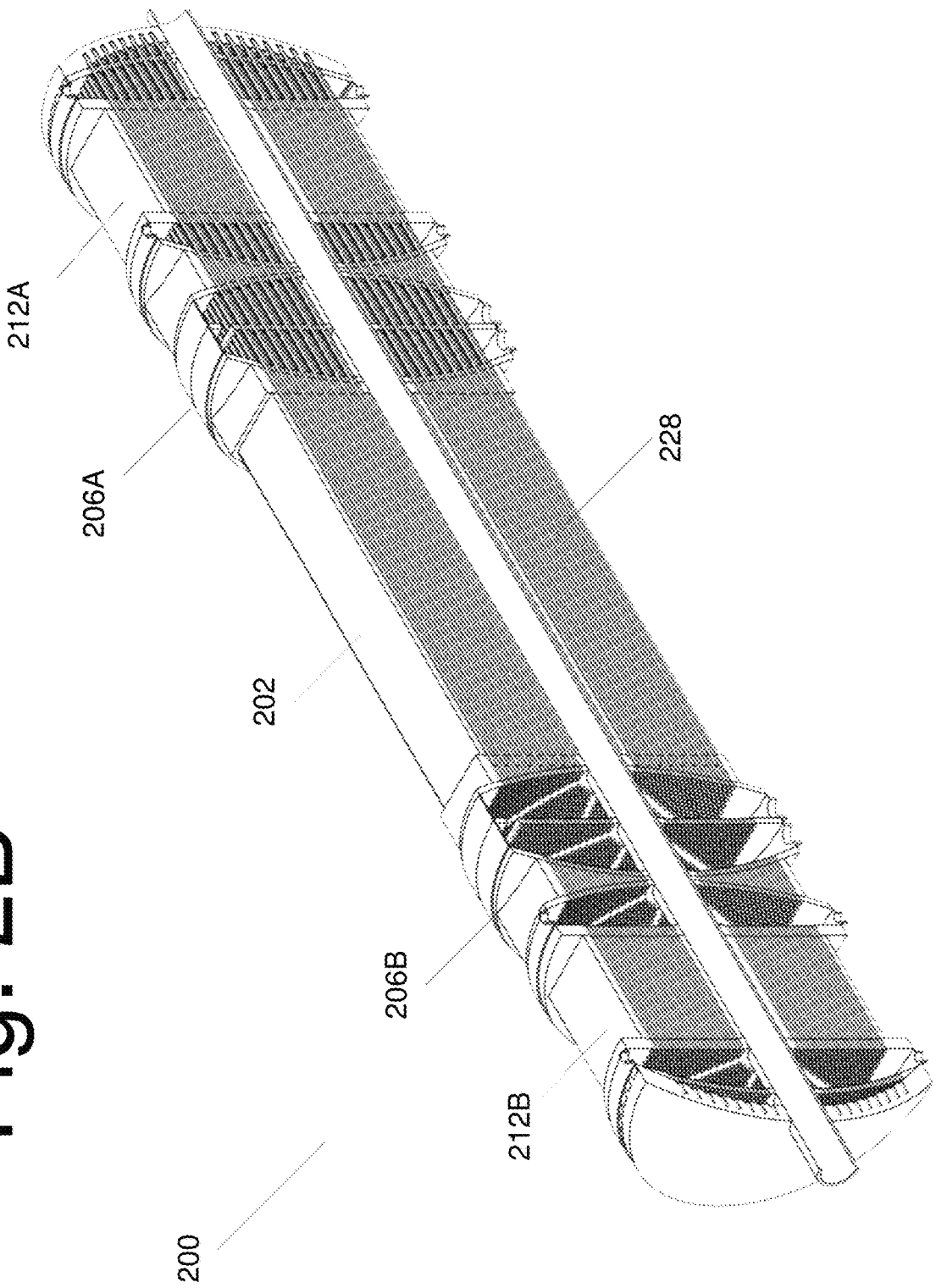

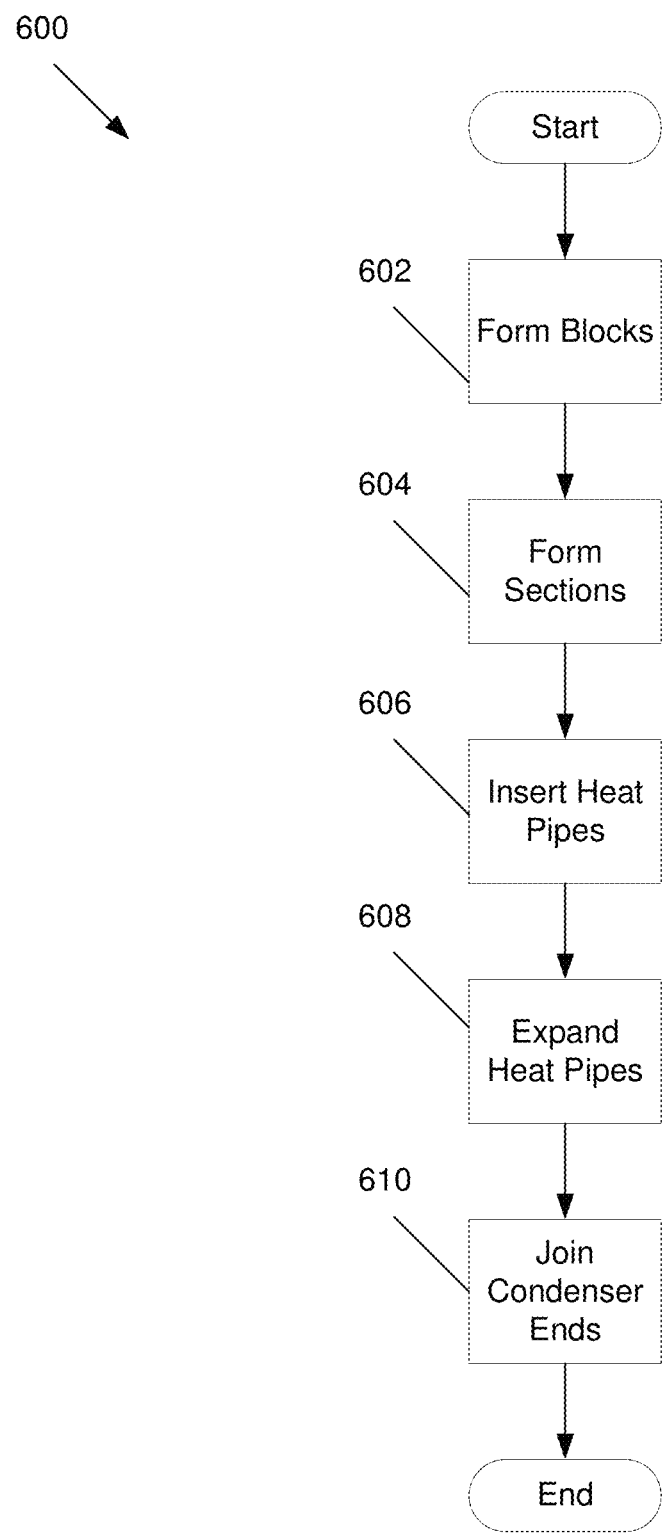

HEAT PIPE REACTOR CORE AND HEAT EXCHANGERS FORMATION AND DEPLOYMENT

CROSS-REFERENCE TO RELATED APPLICATIONS

This application claims the benefit to, and priority to, U.S. provisional application Ser. No. 62/432,396, filed on Dec. 9, 2016. The subject matter of this earlier filed application is incorporated herein in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to a heat pipe reactor core and the formation and deployment of heat exchangers.

BACKGROUND

A heat pipe nuclear reactor core may include discrete heat pipe modules. A heat pipe module may include a single heat pipe with an evaporator bonded to several tubes. These tubes may hold nuclear fuel.

Heat pipe modules are generally bundled together to form a critical assembly when neutron reflectors are placed on the perimeter of the assembly. The bundled heat pipe modules and fuel tubes are mechanically connected at the heat pipe module level and not at the reactor core level.

The array of heat pipe modules spans the reactor core (including the heat pipe evaporator) and through the heat exchanger (including the heat pipe condenser). The heat pipe expands thermally during start up, and if bonded to the heat exchanger, stress may be generated due to the differential thermal expansion.

However, an alternative configuration may be desirable.

SUMMARY

Certain embodiments of the present invention may provide solutions to the problems and needs in the art that have not yet been fully identified, appreciated, or solved by conventional heat pipe reactors. For example, some embodiments of the present invention pertain to a heat pipe reactor core and the formation and deployment of heat exchangers.

In an embodiment, a heat pipe reactor may include a reactor core and one or more heat exchangers positioned on one or both sides of the reactor core. The heat pipe reactor may also include a plurality of heat pipes extending from the reactor core and out through the one or more heat exchangers. The reactor core may be composed of a plurality of monolithic blocks.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 1A-1F illustrates a reactor, according to an embodiment of the present invention.

FIG. 2A is a perspective view illustrating a dual ended reactor, according to an embodiment of the present invention.

FIG. 2B is a cross-sectional view illustrating a dual ended reactor, according to an embodiment of the present invention.

FIG. 6 is a flow diagram illustrating a process of assembling the reactor, according to an embodiment of the present invention.

DETAILED DESCRIPTION OF THE EMBODIMENTS

Figure 1E:
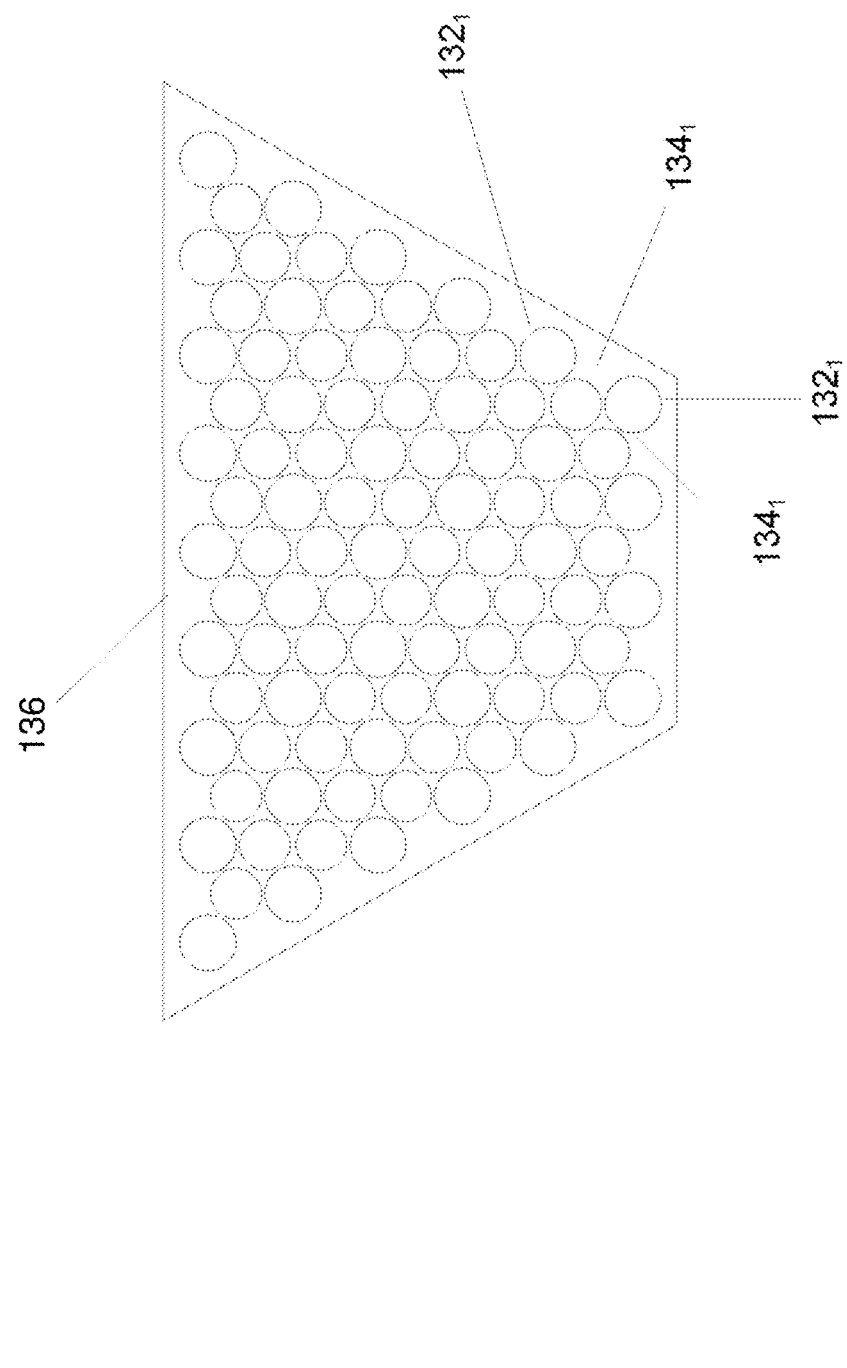

Some embodiments of the present invention pertain to a method of producing a heat pipe reactor. The heat pipe reactor, including the reactor core and heat exchangers, may be part of a chemical or nuclear reactor, depending on the configuration of the heat pipe reactor. For purposes of explanation, the embodiments may be related to a nuclear reactor. The reactor core may include a monolithic block. The monolithic block may be composed of one or more plates. In embodiments that include several plates, these plates may be hot isostatically pressed ("hipped") or cold pressed and diffusion bonded, for example. An array of heat pipes (hereinafter "the heat pipes") may span the cross section of the monolithic block, eliminating the shifting of the heat pipes and the nuclear fuel as the reactor core heats and cools. The monolithic block provides a predictable reactivity feedback as the reactor core heats and cools.

The reactor may also include one or more heat exchangers. In some embodiments, rather than two walls separating the working fluid of the heat pipe from the working fluid of the energy converter, a single wall may exist to separate the working fluid of the heat pipe from the working fluid of the energy converter. This may allow the heat pipes to freely expand and contract axially within the heat exchangers, which minimizes stress due to differential thermal expansion. The heat pipes may also be positioned inside the heat exchangers at room temperature to permit the heat pipes to grow within the channel of the heat exchangers as the reactor core expands radially relative to the heat exchangers.

FIGS. 1A-1F perspective views illustrating a reactor 100, according to an embodiment of the present invention. In some embodiments, reactor 100 includes a reactor core 102, a first transition section 104, a first heat exchanger 106, a second transition section 108, a first manifold 110, a second heat exchanger 112, a second manifold 114, and an end cap 116.

In some embodiments, first and second transition sections 104 and 108 may be any type of lens shaped element. For purposes of explanation, first and second transition sections 104 and 108 will be referred to as "first transition lens 104" and "second transition lens 108". First heat exchanger 106 may be used to remove decay heat, and may be referred to as "decay heat exchanger 106" in one or more of the embodiments described herein. Second heat exchanger may be referred to as "primary heat exchanger 112".

As shown in FIGS. 1B and 1C, heat pipes 128 may project from one end reactor 100 to the other end of reactor 100. Reactor 100 may be composed of metal in some embodiments. In other embodiments, reactor 100 may be composed of stainless steel, super alloy, or refractory metal such as molybdenum. Reactor 100 may use any elemental working fluid, molecular working fluid, or a mixture of the same. For example, an alkali metal heat pipe working fluid, such as cesium, potassium, sodium, lithium, may be used.

In some embodiments, tubes for heat pipes 128 may be expanded by processes, such as swaging, into holes of reactor core 102 or of lens 104. See, for example, FIG. 1F. These expanded tubes may be welded into or reactor core 102 or lens 104, and faced to mate with reactor core 102 by processes such as hipping, for example. It should be appreciated that these embodiments are not limited to welding and hipping.

Heat pipes 128 may span from reactor core 102, first heat exchanger 106, and second heat exchanger 112 and out into end cap 116. Heat pipes 128 may project from either end of reactor core 102 in either the horizontal or the vertical orientations or any other orientation. Reactor core 102 may support heat pipes 128 in a fixed manner. Heat pipes 128 in first heat exchanger 106 and second heat exchanger 112 are supported simply to allow heat pipes 128 to move freely, minimizing stress concentrations due to temperature gradient induced differential expansion.

Heat pipes 128 may be filled by direct transfer of working fluid, or vacuum distillation of working fluid, into the condenser or evaporator ends of individual heat pipes 128. Heat pipe 128 may be sealed by pinch and welding of the fill tube, for example.

Referring to FIGS. 1B and 2B, heat pipes 128 or 228 may be bonded to an inner surface of reactor core 102 or 202. FIG. 1B will be used for the purposes of explanation. This may be accomplished by insertion of a dissolvable mandrel tube inside each heat pipe 128 along the length of reactor core 102. The ends of the dissolvable mandrel tube are closed on either end of reactor core 102. Hydraulic fluid may then be introduced into the mandrel tubes through one or more capillary fluid lines that can pass axially inside heat pipes 128 from either or both ends of heat pipes 128. The hydraulic fluid inside the dissolvable mandrels may be pressurized, allowing the mandrel tube to press the tubes within heat pipe 128 against the block heat pipe holes at reactor core 102. Once expanded, the hydraulic fluid may be removed from the assembly (e.g., mandrel, reactor core 102, heat pipes 128). The assembly is then heated to diffusion bond the tubes within heat pipe 128 to reactor core 102. The mandrel tubes are then removed from the assembly by chemical dissolution.

Reactor Core

Reactor core 102 may include an assembly of one or more monolithic blocks. See, for example, FIG. 1D, which shows an assembly of six monolithic blocks $130_1$, $130_2$, $130_3$, $130_4$, $130_5$, and $130_6$ with a trapezoid cross section, according to an embodiment of the present invention. It should be appreciated that the embodiments should not be limited to six monolithic blocks nor a trapezoid cross section. For instance, cross sectional arrangements may include pentagonal, heptagonal, or octagonal cross sections as well as spherical and nested annular cross sections. Other non-trapezoidal segment arrangements may include triangular or a monolithic segment shapes.

Each monolithic block $130_1$, $130_2$, $130_3$, $130_4$, $130_5$, and $130_6$ may include regularly spaced through holes $132_1$, $132_2$, $132_3$, $132_4$, $132_5$, and $132_6$ oriented axially along the length of reactor core 102. Holes $132_1$, $132_2$, $132_3$, $132_4$, $132_5$, and $132_6$ may include a combination of nuclear reactor fuel rods or other heating elements such as electrical heater (e.g., cartridge heater, graphite heater, etc.), moderator, nuclear control rods, and heat pipes. As shown in FIG. 1B, heat pipes 128 may project from one end of reactor core 102 and out through first and second heat exchangers 106, 112. In other embodiments, and more specifically as shown in FIG. 2B, heat pipes 228 project from both sides of reactor core 202 of dual-ended reactor 200.

Continuing with the discussion of monolithic blocks $130_1$, $130_2$, $130_3$, $130_4$, $130_5$, and $130_6$, each monolithic block $130_1$, $130_2$, $130_3$, $130_4$, $130_5$, and $130_6$ includes several plates. FIG. 1E, for example, illustrates a plate 136 with a pattern of holes $132_1$ with heat pipes arranged along the perimeter of plate 136, as well as fuel tubes $134_1$ arranged within the interior of plate 136. This may avoid heat pipe core cascade failure.

Figure 3:
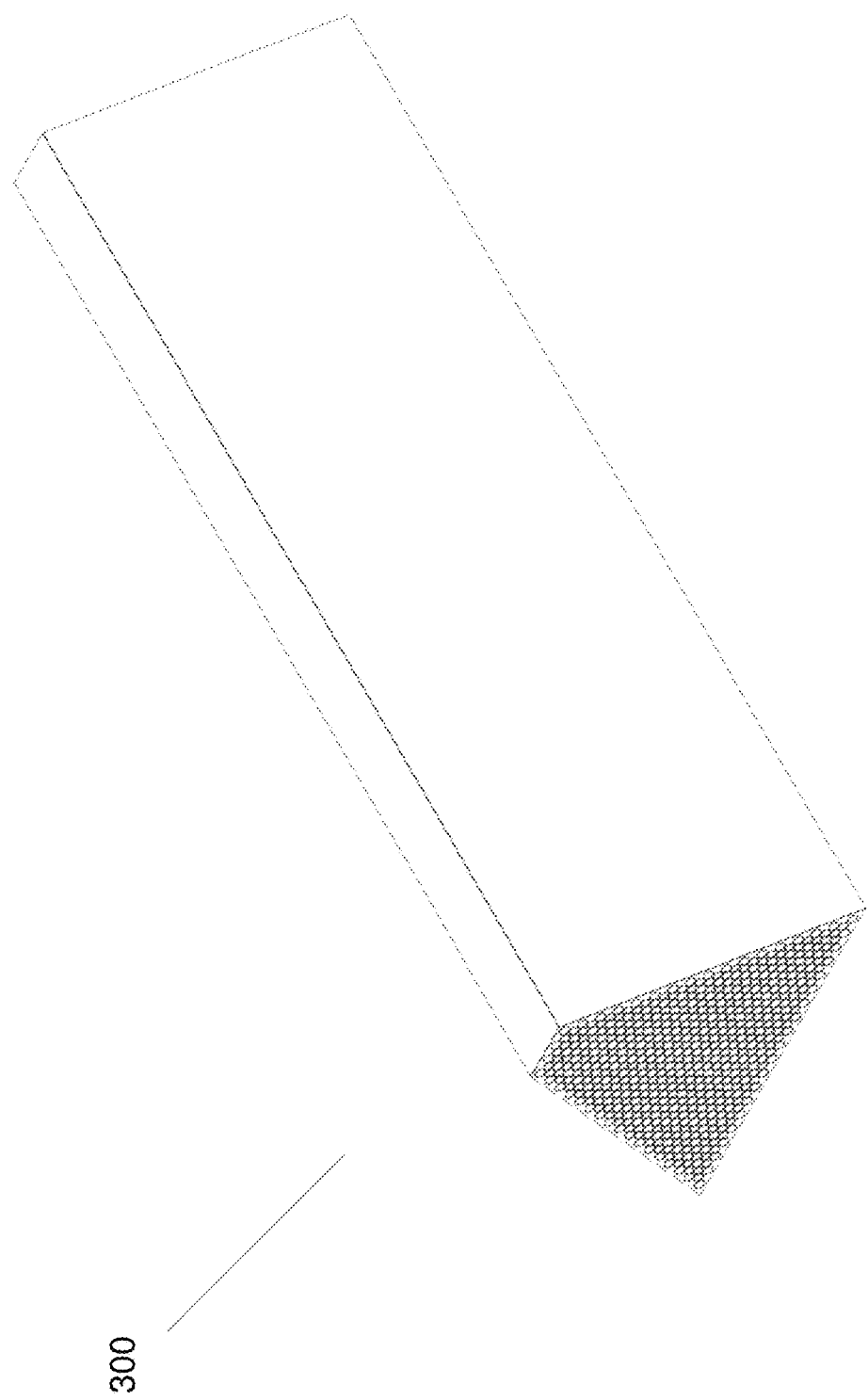
FIG. 3 illustrates a monolithic block, which may be part of a reactor core, according to an embodiment of the present invention.

It should be appreciated that monolithic blocks $130_1$, $130_2$, $130_3$, $130_4$, $130_5$, and $130_6$ may be formed with a series of axially bonded perforated (or drilled) plates. See, for example, FIG. 3, which illustrates a monolithic block 300, which may be part of a reactor core, according to an embodiment of the present invention. Monolithic block 300 may include multiple plates that are machined together. A pattern of holes may be drilled into the plates, and these plates may be hipped together or diffusion bonded, for example. It should be appreciated that the plates may be joined using one or more of the following techniques—diffusion bonding, brazing, welding, vacuum hot pressing, additive manufacture, or hot isostatic pressing. It should be appreciated, however, that the embodiments described herein are not limited to these techniques, and are provided for purposes of explanation. It should also be appreciated that these joining techniques may be used to join any component of reactor 100.

Returning to FIG. 1A, reactor core 102, first and second transition lenses 104, 108, and heat exchangers 106, 112 may be joined using one or more of the above-mentioned joining techniques. As mentioned above, reactor core 102 may be formed from several monolithic plates, each of the monolithic plates composed of plates. See, for example, FIG. 3, which shows a monolithic block 300 composed of several plates. As shown in FIG. 1B, an array of seamless or welded tubes (or heat pipes) 128, which are inserted through the holes of the plates, string the plates together for aligning or sealing before bonding. Once bonded, these pipes 128 may remain at their initial thickness or have their interior diameter increased by line boring, for example.

As discussed above, the monolithic blocks may be manufactured from a series of pre-machined perforated plates. See, for example, FIG. 1E. In this example, plates 136 may be arranged axially or radially, irrespective of the bonding technique. In some embodiments, upon forming of the monolithic block, line boring further opens holes $132_1$, which was briefly discussed above. Honing or chemical vapor deposition of the inner surface of holes $132_1$ may provide final finish to diminish the number and size of potential boiling nucleation sites thereon.

Embedding thermodynamically stable materials, such as titanium, zirconium, and hafnium, into the wall of heat pipe 128 at or below the inner surface of heat pipe 128 getters oxygen and other non-metallic impurities from sources. These sources may be both external and internal to heat pipe 128 in some embodiments. These materials may be embedded using techniques such as hydroformed foils, thin walled tubes, or chemical vapor deposition. Placing thermodynamically stable materials, such as titanium, zirconium, and hafnium, into the inner spaces of heat pipe 128 getters oxygen and other non-metallic impurities from sources that are both external and internal to heat pipe 128. These materials may include coatings, wires, and foils.

Heat Exchangers

Returning to FIGS. 1A and 1B, heat pipes 128 project from reactor core 102 to one or more heat exchangers 106, 112. In other embodiments, heat pipes may project from reactor core to heat exchangers, which may be on one or both sides of the reactor core. See, for example, FIGS. 2A and 2B, which show a dual ended reactor 200, according to an embodiment of the present invention. In this embodiment, heat pipes 228 may project from reactor core 202 to heat exchangers $206_A$, $206_B$, $212_A$, $212_B$. Referring to FIG. 2B, for illustrative purposes of showing heat exchanger detail in reactor 200, the array of heat pipes 228 may extend into heat exchangers $206_A$ and $212_A$, but not into heat exchangers $206_B$ and $212_B$.

Returning to FIGS. 1A and 1B, first heat exchanger 106, for example, may span azimuthally across the entire face of reactor core 102, allowing heat pipes 128 to project from reactor core 102 to pass through. This may simply the assembly process for reactor 100. Alternatively, first and second heat exchangers 106, 112 may azimuthally cover only each monolithic block of reactor core 102 allowing only the heat pipes projecting from each segment to project through them.

First and/or second heat exchangers 106, 112 may be manufactured from a series of pre-machined plates arranged axially or radially, irrespective of bonding technique.

First heat exchanger 106 may include ports 124 and 126. For example, as shown by the dashed-line arrow 140 in FIG. 1C, gas may enter port 124, and move up through heat pipes 128, and moves axially across first heat exchanger, and down through heat pipes 128, and finally exit out from port 126. In other embodiments, port 124 and port 126 may perform the same functions or the opposition functions as the other.

First heat exchanger 106 may remove radioactive decay heat generated from nuclear reactor core fission products following shutdown. First heat exchanger 106 may reject decay heat to any suitable end use or place with any suitable heat transfer working fluid in any state. The ends of the decay-heat removal heat exchanger may have convex shape to minimize stress on the heat exchanger walls from internal pressure of a pressured working fluid. See, for example, FIG. 1F.

Second heat exchanger 112 may remove fission heat generated during reactor operation. In some embodiments, one or more heat exchangers may be attached to reactor core 102. Heat pipes may link reactor core 102 to first heat exchanger 106. First heat exchanger 106 may reject fission heat via the working fluid through gas manifolds and working fluid ports 120, 122 to any suitable end use or place with any suitable heat transfer working fluid. For example, as shown in FIG. 1C, gas may enter through port 120, traverses across heat pipes 128 and flows through an annular region between heat pipe 128 and second heat exchanger 112, and out through port 122. Manifolds 110, 114 may be placed on either end of second heat exchanger 112, and may have convex shape to minimize stress on the walls of second heat exchanger 112 from the internal pressure of gas or the heat exchange medium. See, for example, FIG. 1F.

The body of second heat exchanger 112 may be produced from a series of pre-machined perforated plates arranged axially or radially, irrespective of the bonding technique. Manifolds 110, 114 may be produced by a combination of hydroforming (or additive manufacture) of a series perforated curved sections that match the projected heat pipe hole pattern. Manifolds 110, 114 may then be attached to the body of second heat exchanger 112 by one or more techniques. These techniques may include welding, hot isostatic pressing, additive manufacture, diffusion bonding, vacuum hot pressing, or brazing.

End cap 116 may be a cover or a solid plate, with a hemispherical cross-section. End cap 116 may include sockets for heat pipes 128 to expand into and move radially and axially within end cap 116. This may form a pressure boundary by sealing the medium of second heat exchanger 112 from the environment external to reactor 100.

Transition Lens

Reactor core 102 and first heat exchanger 106 are connected using a first transition lens 104. A second transition lens 108 may connect reactor core 102 to second heat exchanger 112. Second transition lens 108 may also connect first heat exchanger 106 to second heat exchanger 112. Although not shown, first and second transition lens 104, 108 may also connect a first heat exchanger to another first heat exchanger, second heat exchanger to another secondary heat exchanger, or any combination thereof. First and second transition lens 104, 108 may span the entire core cross section or be segmented azimuthally as reactor core 102. Transition lens 104, 108 may have a perimeter that largely conforms to the shape of the heat pipe pattern projecting from reactor core 102.

Transition lens 104, 108 may have a flat shape, a convex shape, a concave shape, or any combination thereof, to minimize stress concentrations in reactor core 102, first heat exchanger 106, or second heat exchanger 112. Simply put, transition lens 104, 108 form lens shaped elements with through holes reflecting the pattern of heat pipes projecting from reactor core 102. In certain embodiments, transition lens 104, 108 may be formed by a combination of hydroforming a series perforated curved sections that may then be attached together. Techniques used for attachment may be similar to the joining technique discussed above.

A hole (or tunnel) 118 may be placed along the center axis of the central cross sections of heat exchangers 106, 112, transition lens 104, 108, and reactor core 102. Hole 118 may serve as a cylindrical passage for neutron absorption material to control core criticality. This way, hole 118 is hermitically sealed, preventing gas from ports 120, 122, 124, or 126 to exit from hole 118.

Figure 4:
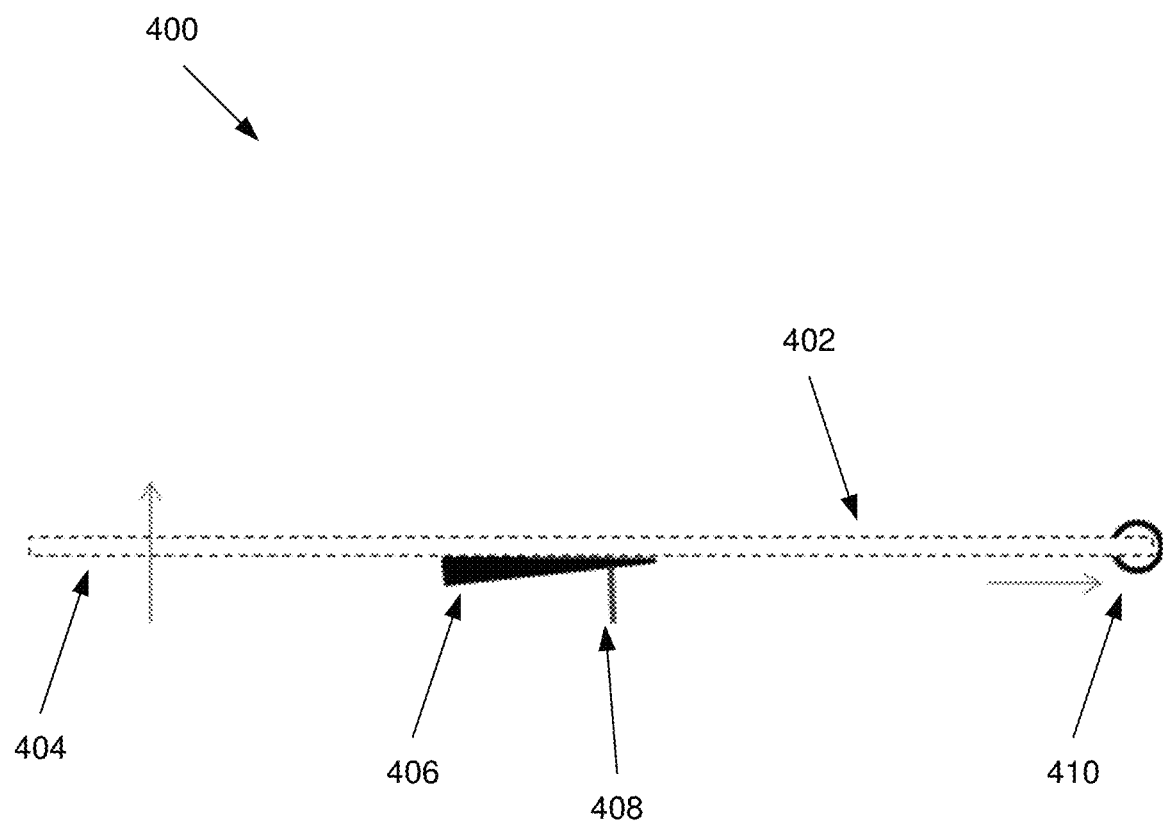
FIG. 4 illustrates an operation 400 of heat pipe centering cam 402, according to an embodiment of the present invention.

FIG. 4 illustrates an operation 400 of heat pipe centering cam 406, according to an embodiment of the present invention. In some embodiments, heat pipe condenser 402 may be supported by a simple support 408, which is in contact heat pipe centering cam 406 to accommodate differential thermal expansion of the heat pipe and reactor core 404 during start up, operation, and shutdown. A heat pipe centering cam 406 on the heat-pipe surface centers the heat pipe in the heat exchanger channel 410 as reactor core 404 expands radially and the heat pipe expands axially during start up.

Figure 5:
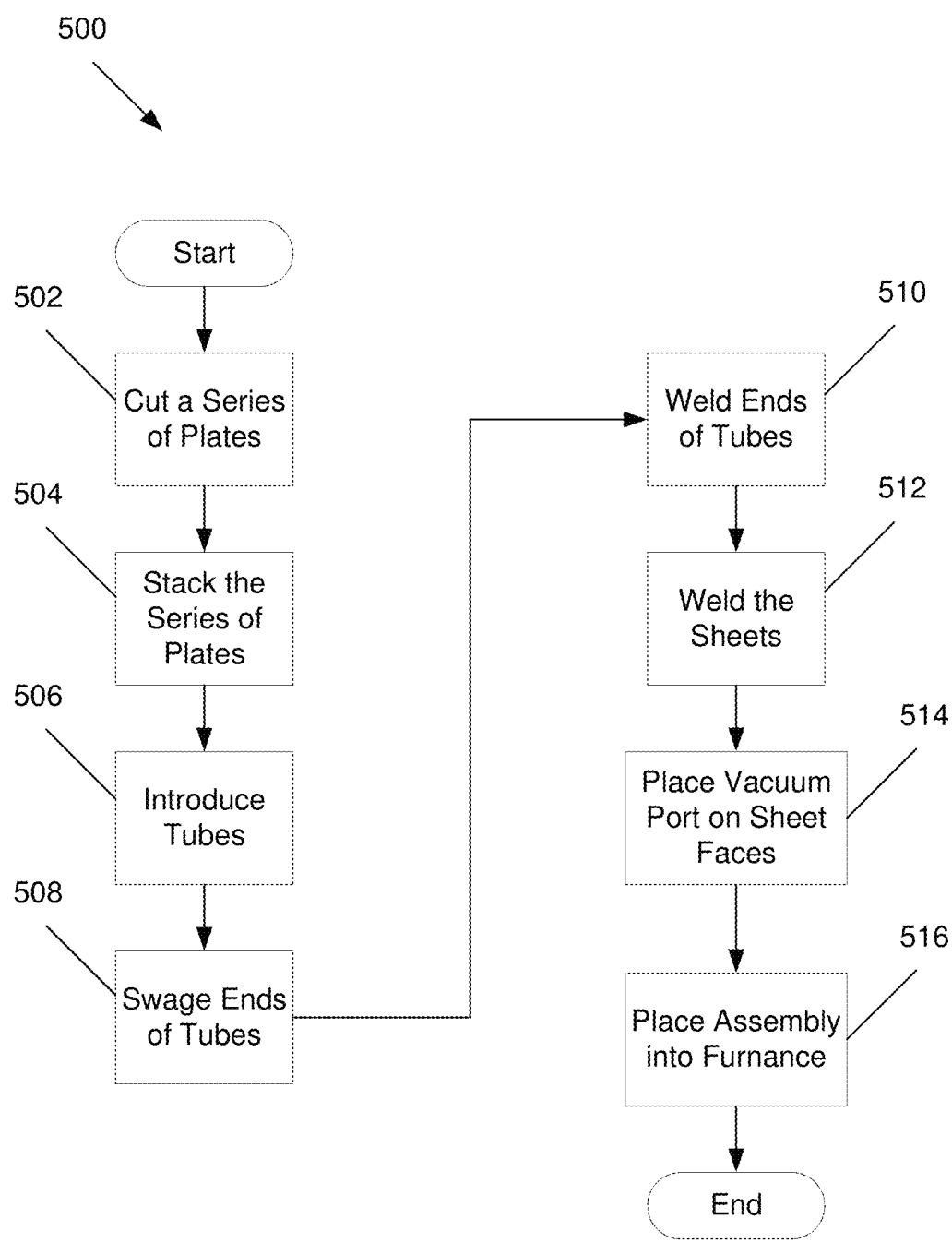
FIG. 5 is a flow diagram illustrating a process for assembling the monolithic blocks, according to an embodiment of the present invention.

FIG. 5 is a flow diagram illustrating a process 500 for assembling the monolithic blocks, according to an embodiment of the present invention. In some embodiments, process 500 may begin at 502 with cutting a series of plates with holes drilled according to the heat pipe and fuel rod pattern. At 504, stacking the series of plates, and at 506, introduce a series of tubes into the heat pipe and fuel rod holes. At 508, the ends of the tubes are then swaged to the inside diameter of the top and bottom plates in the series of plates. At 510, the tube ends are then welded to the end plates, hermetically sealing the tubes to the monolithic block. At 512, sheets are welded to the side walls of the stack of plates. At 514, a vacuum port may be placed on one or more of the sheet faces, allowing the evacuation of the hermetically welded plate assembly. The assembly may then be introduced at 516 into a furnace where the assembly is brought to sufficient temperature and external pressure to metallurgically bond all parts (e.g., hot isostatic pressing). A similar process may be applied for forming the secondary heat exchanger.

The sealing of the heat pipe tubes results in a hermetically sealed tube. However, one of ordinary skill in the art would understand that the heat pipe tubes are not limited to being continuous. In certain embodiments, the heat pipe tubes may be segmented in a hermetic fashion by way of hipping or other processes that achieve a similar result. For example, the heat pipe tubes are initially segmented, and by hipping or welding, become a continuous tube.

FIG. 6 is a flow diagram illustrating a process 600 of assembling the reactor, according to an embodiment of the present invention. For example, process 600 may begin at 602 with forming several monolithic blocks from a series of plates. At 604, transitional sections (or lenses) are formed. This may include the first and second lenses, as well as the heat exchangers depending on the selected embodiment. At 606, once the reactor core, the lenses, and the heat exchangers are formed, heat pipes may be inserted within the holes of the monolithic blocks of the reactor core. In another embodiment, the monolithic block holes may also serve as heat pipe walls. At 608, in certain embodiments, the heat pipes may be expanded into the monolithic block using hydraulic pressure. At 510, the condenser ends of the heat pipes may be joined using one or more of the above-mentioned techniques.

In some embodiments, augmented heat exchange surfaces may be manufactured on the perimeter of the heat pipe condenser, enhancing convective heat transfer coefficient. These augmented surfaces include circumferential, axial, or helical ribs, fins, swirl promotion, or similar heat transfer enhancement devices. These heat transfer enhancement devices may be formed while manufacturing the heat pipe wall. For example, machining, drawing, additive manufacture or similar technique may increase radial heat transfer from the heat pipe condenser. Once the elements bond together, the overall assembly is chemically cleaned, and vacuum fired to remove non-metallic impurities from the inner heat pipe surface to prevent impurity-induced corrosion.

During operation, the reactor is heated and cooled at finite rates to control differential thermal expansion between the hot core and heat pipes and the cooler heat exchanger parts. Heat exchanger surface temperature may be controlled by trace heat from electrical elements, such as nichrome, to minimize thermal stresses and cycle fatigue. Temperature gradient minimization may be realized across the reactor and heat exchangers by controlling heat exchanger coupling to the working fluid and/or by operating the reactor core at a low power. This may be accomplished using fission or decay heat in a standby operating mode.

In some embodiments, remote repair of contaminated or non-working but filled heat pipes may be performed by cutting into one or both ends of the heat pipes, cleaning with steam, rewelding at one end of the heat pipe, chemically cleaning, vacuum firing with a localized heater rod, reintroduction of a new wick, heat pipe closure welding, and filled by direct transfer or vacuum distillation of working fluid.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a heat pipe reactor comprising a reactor core and one or more heat exchangers positioned on one or both sides of the reactor core, wherein
the heat pipe reactor further comprising a plurality of heat pipes extending from the reactor core and out through the one or more heat exchangers, and
the reactor core being composed of one or more monolithic blocks, wherein
each of the plurality of heat pipes are simply supported in the one or more heat exchangers, expanding and contracting axially, minimizing stress applied from differential thermal expansion between each of the plurality of heat pipes and the one or more heat exchangers.

2. The apparatus of claim 1, wherein each of the one or more monolithic blocks comprises a pattern of holes oriented along a length of the reactor core.

3. The apparatus of claim 2, wherein each hole of the pattern of holes house one of nuclear fuel rods or other heating elements, moderator, nuclear control rods, and the plurality of heat pipes.

4. The apparatus of claim 2, wherein the plurality of heat pipes are arranged along the perimeter of the one or more of the monolithic blocks and fuel tubes are arranged within the interior of the one or more monolithic blocks.

5. The apparatus of claim 1, wherein the plurality of heat pipes are fixed within the one or more monolithic blocks or a structural transition lens, or both, to allow the plurality of heat pipes to expand and contract with the one or more monolithic blocks or the structural transition lens, or both as the reactor core heats and cools.

6. The apparatus of claim 1, wherein the one or more heat exchangers comprises at least one decay heat exchanger, at least one primary heat exchanger, or both.

7. The apparatus of claim 2, wherein the pattern of holes are configured to allow the plurality of heat pipes to move freely in annular regions.

8. The apparatus of claim 1, wherein a first heat exchanger of the one or more heat exchangers comprises a first port and a second port, wherein
gas enters into the first port, and moves up through the plurality of heat pipes, and axially across the first heat exchanger, and down through the plurality of heat pipes, finally exiting out from the second port.

9. The apparatus of claim 1, wherein gas enters through a first port, traversing across the plurality of heat pipes and flowing through an annular region between the plurality of heat pipes and second heat exchanger, and out through a second port.

10. The apparatus of claim 9, wherein the second heat exchanger is placed between a first manifold and a second manifold both of which comprise a concave shape to minimize stress on walls of the second heat exchanger from internal pressure of the gas.

11. A heat pipe reactor, comprising:
a heat pipe reactor comprising a reactor core and one or more heat exchangers positioned on one or both sides of the reactor core, wherein
the heat pipe reactor further comprising a plurality of heat pipes extending from the reactor core and out through the one or more heat exchangers,
the plurality of heat pipes are simply supported in the one or more heat exchangers, expanding and contracting axially to minimize stress applied from differential thermal expansion,
the reactor core being composed of one or more monolithic blocks, and the heat pipe reactor further comprising a structural transition lens between the reactor core and the one or more heat exchangers.

12. The heat pipe reactor of claim 11, wherein the one or more monolithic blocks comprise a pattern of holes oriented along a length of the reactor core.

13. The heat pipe reactor of claim 12, wherein the plurality of heat pipes are arranged along the perimeter of the one or more monolithic blocks and fuel tubes are arranged within the interior of the one or more monolithic blocks.

14. The heat pipe reactor of claim 12, wherein the plurality of heat pipes are fixed within the one or more monolithic blocks or the structural transition lens, or both, to allow the plurality of heat pipes to expand and contract with the one or more monolithic blocks or the structural transition lens, or both as the reactor core heats and cools.

15. The heat pipe reactor of claim 14, wherein the pattern of holes are configured to allow the plurality of heat pipes to move freely in annular regions.

* * * * *